United States Patent [19]

Ritter et al.

[11] 4,232,820
[45] Nov. 11, 1980

[54] HEAT COLLECTOR SYSTEM

[75] Inventors: Alfred E. Ritter, Mülheim; Jürgen Kleinwächter, Lörrach, both of Fed. Rep. of Germany

[73] Assignee: Max-Planck-Gesellschaft zur Fördenung der Wissenschaften e.V., Göttingen, Fed. Rep. of Germany

[21] Appl. No.: 829,427

[22] Filed: Aug. 31, 1977

[30] Foreign Application Priority Data

May 6, 1977 [DE] Fed. Rep. of Germany ....... 2720319

[51] Int. Cl.² ............................................. F24J 3/02
[52] U.S. Cl. ..................................... 237/2 B; 62/2; 126/433; 237/1 R
[58] Field of Search ............. 62/238 E, 2, 79; 237/2 B, 1 R; 126/271

[56] References Cited

U.S. PATENT DOCUMENTS

| 2,713,252 | 7/1955  | Jackson et al. | 62/2 X      |
| 3,919,998 | 11/1975 | Parker         | 237/1 R X   |
| 3,996,759 | 12/1976 | Meckler        | 62/238 E X  |
| 4,046,133 | 9/1977  | Cook           | 237/1 R X   |
| 4,049,407 | 9/1977  | Bottum         | 62/238 E X  |
| 4,062,489 | 12/1977 | Henderson      | 62/2 X      |
| 4,065,938 | 1/1978  | Jonsson        | 62/238 E X  |
| 4,083,358 | 4/1978  | Scott          | 237/1 R X   |

FOREIGN PATENT DOCUMENTS 2617324  4/1976  Fed. Rep. of Germany ........... 126/271

Primary Examiner—Rodney H. Bonck
Attorney, Agent, or Firm—Neil F. Markva

[57] ABSTRACT

The heat collector system comprises a heat collector connected to a heat pump. The heat collector has an inlet conduit and contains a heat transmitting fluid and is effective to take radiation heat from the environment. The heat collector has a structural configuration effective to additionally absorb convection heat as a convector which causes a good heat transmission between the ambient air and the heat transmitting fluid. A rated and controlled cooling device is connected to the heat conduit of the heat collector. The cooling device is effective to supply fluid to the heat collector at a temperature below the temperature of the ambient air. Further features of the invention include a regulating device effective to regulate the difference in temperature between the temperature of the ambient air and the cooling temperature. The collector may be composed of two superimposed chambers including an upper chamber made of transparent material and having a heat conductive surface and a lower chamber having a structural configuration effective to absorb heat radiation.

9 Claims, 6 Drawing Figures

HEAT COLLECTOR SYSTEM

FIELD OF THE INVENTION

The invention relates to a heat collector system comprising a heat collector containing a heat transmitting fluid and being effective to take heat of radiation from the environment. The outlet of the heat collector is connected to a heat pump.

BACKGROUND OF THE INVENTION

It is known to use sun or solar collectors in combination with heat pumps to convert radiation energy of the sun into useful heat. (See Journal "Elektrizitätsverwertung" No. 3/1975) The heat collector may consist of tubes laid on a roof surface having heat transmitting fluid circulating therein. The fluid may consist of water or salt water. When it leaves the collector, fluid is supplied to the heat pump which withdraws heat therefrom. Known collector plants for operations take up radiation energy. At the same time, heat is again discharged by convection to the environment because the temperature of the collector plants is higher than the ambient temperature.

SUMMARY OF THE INVENTION

The primary object of the invention is to provide a heat collector system or plant which does not only absorb radiant energy but also takes up energy by heat exchange action. The heat collector has a structural configuration effective to receive convection heat as a convector which causes a good heat transmission between the ambient air and the heat transmitting fluid inside the collector. A cooling device is disposed in the inlet circuit to the collector. The cooling device is so rated and controlled that the fluid to be supplied to the heat collector is cooled below temperature of the ambient air.

The crux of the invention is directed to the concept of ensuring that the lower temperature level assumed by the fluid when passing the collector is sufficiently low so that there is a difference in temperature between ambient air and fluid. When the outside or ambient temperature is lower, the cooling of the heat transmitting fluid is conveniently less strong and accomplished by increasing the flow rate of the fluid through the collector. This concept results from the relationship:

$$\Delta T \cdot \text{volume flow} = \text{energy}$$

where $\Delta T$ is the difference in temperature between the fluid inlet and the fluid outlet of the collector. Neither the fluid nor the collector emits heat to the environment, but the system has a structural configuration effective to additionally take up the heat from the environment. Surprisingly, the energy additionally supplied far exceeds the additional energy required at the heat pump to overcome the greater difference in temperature. To absorb as much heat as possible, the temperature of the fluid introduced into the collector is intentionally kept low or the flow rate of the fluid in the collector is increased.

The cooling device or mechanism may consist of a heat exchanger of the heat pump. The heat pump increases the temperature of the heat medium and withdraws heat from the fluid. In accordance with the invention, the cooling of the fluid connected therewith is so strong that the fluid is cooled below the ambient temperature; that is, below temperature of the outside air. While the fluid subsequently flows again through the heat collector, it is heated by the combination of heat radiation and convection through the heat conduit by the sun energy and the ambient air. The amount of low temperature heat is the greater, the cooler the fluid is introduced into the heat collector or the greater the difference in temperature is between the outside air and the introduced fluid. When the temperature of the collector is lower than that of the ambient air, condensor water may be formed on the surface of the collector. Thus, the temperature of the fluid is increased additionally by the condensation heat. Condenser water drops shall be immediately evacuated as they develop so that they may not evaporate by heat removal at the collector surface. Evacuation is effected by coating the outer surface of the heat collector with a material which increases surface tension of the water drops causing the water drops to easily roll away.

A control device is used to regulate the difference in temperature between the ambient air and the cooling temperature of the fluid thereby controlling the heat pump. This difference in temperature may be kept constant in dependency from the temperature of the ambient air. The temperature may also decrease as the rise of temperature of the ambient air becomes higher because with a warmer ambient air, less caloric power is generally required. If the fluid is preheated before it is introduced into the heat pump, the heat pump may be operated much more efficiently.

The radiation energy may generally be sufficient to generate the required amount of heat when there is a strong sun radiation. However, the use of additional heat convection is required when there are clouds or the light is diffuse. In this instance, the heat collector may consist of two superimposed chambers, one above the other. The lower chamber has a structural configuration effective to absorb radiation, while the upper chamber has a high heat conductive surface. If direct sun radiation is sufficient to provide the heat consuming device connected to the collector, the fluid may also be caused to flow through the upper chamber. In this particular variation or embodiment, the two chamber convector becomes a heat exchanger for ambient air and sun radiation. The heat radiation penetrates the upper chamber and is absorbed in the fluid of the lower chamber or at the walls of the lower chamber. On the other hand, the upper chamber has a high heat conductive surface which may also be corrugated or enlarged by another corresponding structural design. The structure of the upper chamber is designed to attract as much ambient air as possible at the surface with special ventilators and/or wind guide plates being provided at a spaced laterally displaced distance therefrom. In this instance, the upper collector chamber acts predominantly as a heat exchanger while the lower collector chamber acts predominantly as an absorber.

According to another embodiment of the invention, the two chambers of a two chamber collector may be separated by the insulating air layer and each connected to a separate fluid circuit. The upper chamber is transparent and constantly filled with fluid thereby ensuring the heat exchange with the environment by connecting its fluid flow to the evaporator of a heat pump. The lower chamber includes an absorptive layer for heat radiation and is integrated in a separate fluid flow circuit coupled either directly to a heat consuming unit or indirectly through a heat exchanger. When sufficient energy is available or obtained from the radiation heat alone, the fluid flow in the upper chamber is not circulated. Only the fluid flow in the lower chamber is effected. However, if the amount of radiation heat energy is insufficient or does not have the capacity to meet a particular high demand of energy, the fluid flow of the upper chamber is actuated and conducted either directly to the evaporator of the heat pump or, optionally, only upon passing the heat exchanger for the fluid flow of the lower chamber. Thus, the fluid flow of the upper chamber is reheated by the heat of the lower energy which, when there is a sufficient amount of heat energy available, is warmer.

There are several important features associated with the system of this invention. For example, the heat collector may be located on a roof where it can additionally take up the heat loss in the building. As is known, great quantities of heat are evacuated from buildings into the open air by virtue of the ventilation and heating systems therein. It is possible to connect the heat collector of the invention to an exhaust air tube or a chimney so that the outflowing gases pass along the surface of the heat collector to cause a heating of the fluid flowing therein. Thus, it is possible to recover a great amount of the heat energy otherwise lost through the exhaust systems of the building. The heat collector plant of the invention may be used in the summer for cooling. When assembled on the roof of a building a cooling of the fluid in the collector is effected during the night. In other words, the collector delivers heat to the ambient air. Therefore, the coldness stored in the collector during the night may be supplied to the building in measured or dosed intervals during the day. Alternatively, heat energy may be taken up during the daytime and then released into the building during the night. The energy in the heat collector can be stored if the full amount of energy is not removed temporarily.

Another feature of the invention provides for the use of inclined mirrors mounted near the collector to reflect the incident sun radiation on the collector. This clearly increases the efficiency of the heat collector. Furthermore, the disposition of the mirrors may be such as to provide an additional wind guide surface between the mirror surfaces and the outside surface of the collector.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
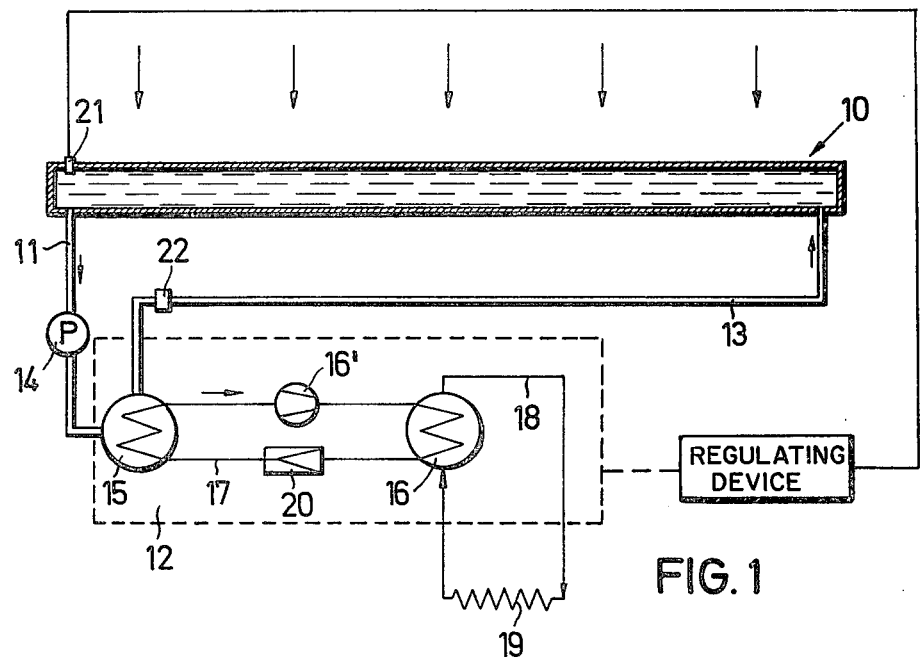
FIG. 1 is a schematic circuit diagram of an embodiment of the heat collector system made in accordance with this invention.

In FIG. 1, heat collector, generally designated 10, comprises a flat container filled with a fluid such as water or salt water. Collector 10 may also take the form of tubes or hoses which are placed in a plane exposed to sun radiation. The outlet conduit 11 connects the heat collector 10 to the heat pump 12. The heated fluid leaves the collector 10 and is cooled in the heat pump 12. The cooled fluid is then recirculated to the heat collector 10 via inlet conduit 13 at a temperature which is below that of the ambient air of the heat collector 10. Inlet conduit 13 is connected to heat collector 10 at an end opposite to the connection of outlet conduit 11. Consequently, the fluid has to flow through the entire heat collector 10 throughout its cycle. Circulating pump 14 connected to line 11 is used to drive the fluid through the system.

Heat pump 12 has two heat exchangers 15 and 16 interconnected by a closed cooling fluid circuit 17. Gaseous cooling fluid leaves the cooling spiral of heat exchanger 15 and is compressed in condensor $16^1$ and correspondingly heats up. The heated gaseous fluid is then directed into the heating spiral of the heat exchanger 16 located in the secondary circuit 18 which includes the heat consuming device 19. The gaseous cooling fluid then leaves the heating spiral of exchanger 16 and moves through the relaxation nozzle 20 where it relaxes, expands and cools down. Thus, heat exchanger 15 is cooled by the gaseous cooling fluid and the heat exchanger 16 is heated by said fluid. Thus, the extent of cooling and heating substantially depends upon the condensing ratio of condensor or heat exchanger 16. The condensing ratio is so selected that the cooling of the fluid is effected up to a temperature which is below the ambient temperature of heat collector 10.

A temperature sensor 21 is located in the outlet of the heat collector 10 and a temperature feeler 22 is located in the inlet conduit 13. The temperature values measured at these sensors 21 and 22 may be used for controlling the inlet temperature of the fluid or for the control of the condensor or heat exchanger 16.

In the embodiment of FIG. 1, heat collector 10 has only one sole fluid layer. Thus, heating of the fluid is caused by absorption of incident sun radiation and by convection at the surface of the collector 10. Thus, collector 10 may be fitted on a roof to absorb the heat loss of the roof at the same time that heating is obtained through incident sun radiation and convection. Color additives and the like may be added to the fluid to increase the absorptive capacity of radiation. The upper side of the heat collector 10 must be composed of material which conducts heat very well.

Figure 2A:
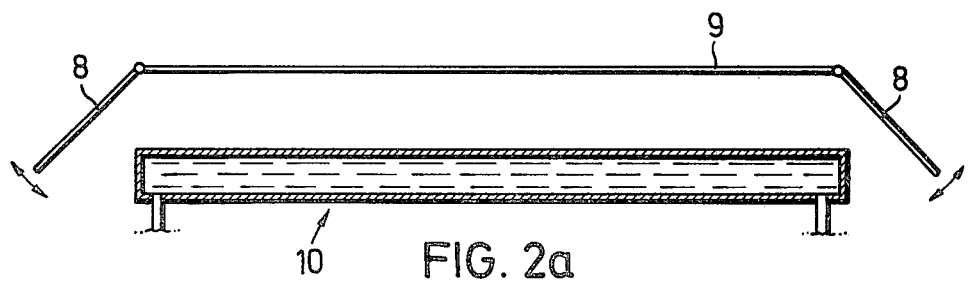
FIGS. 2a and 2b are diagrammatic views partly in cross section showing two embodiments of a cover for the heat collector used in the system made in accordance with this invention.
Figure 2B:
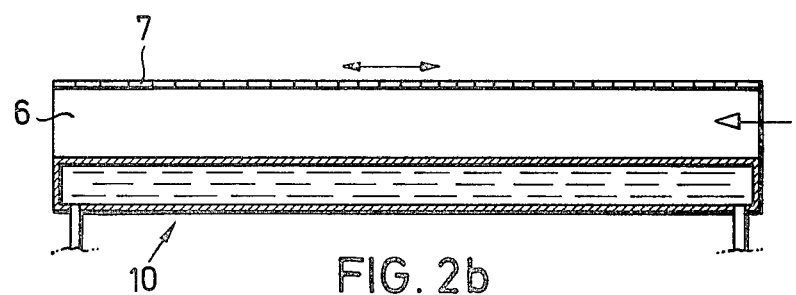

Cover structures are shown for collector 10 in FIGS. 2a and 2b. A radiation permeable plate 9 is disposed parallel to and laterally displaced a distance above collector 10. Flap wings 8 are hingedly connected at either end of plate 9 and swing about the hinge pivot point as shown by the double arrows. When flap wings 8 are folded down, collector 10 is heated only by sun radiation but not by ambient heat. When flap wings 8 are folded up, hot air may pass along between collector 10 and plate 9 so that the collector is additionally heated by convection.

In FIG. 2b, a retractable roller blind cover 7 is disposed at a location laterally displaced a distance above collector 10. Cover 7 may be retracted in a known manner. An air cushion 6 is formed between the collector 10 and roller blind cover 7. Again, this configuration enables collector 10 to be heated by convection.

Figure 3:
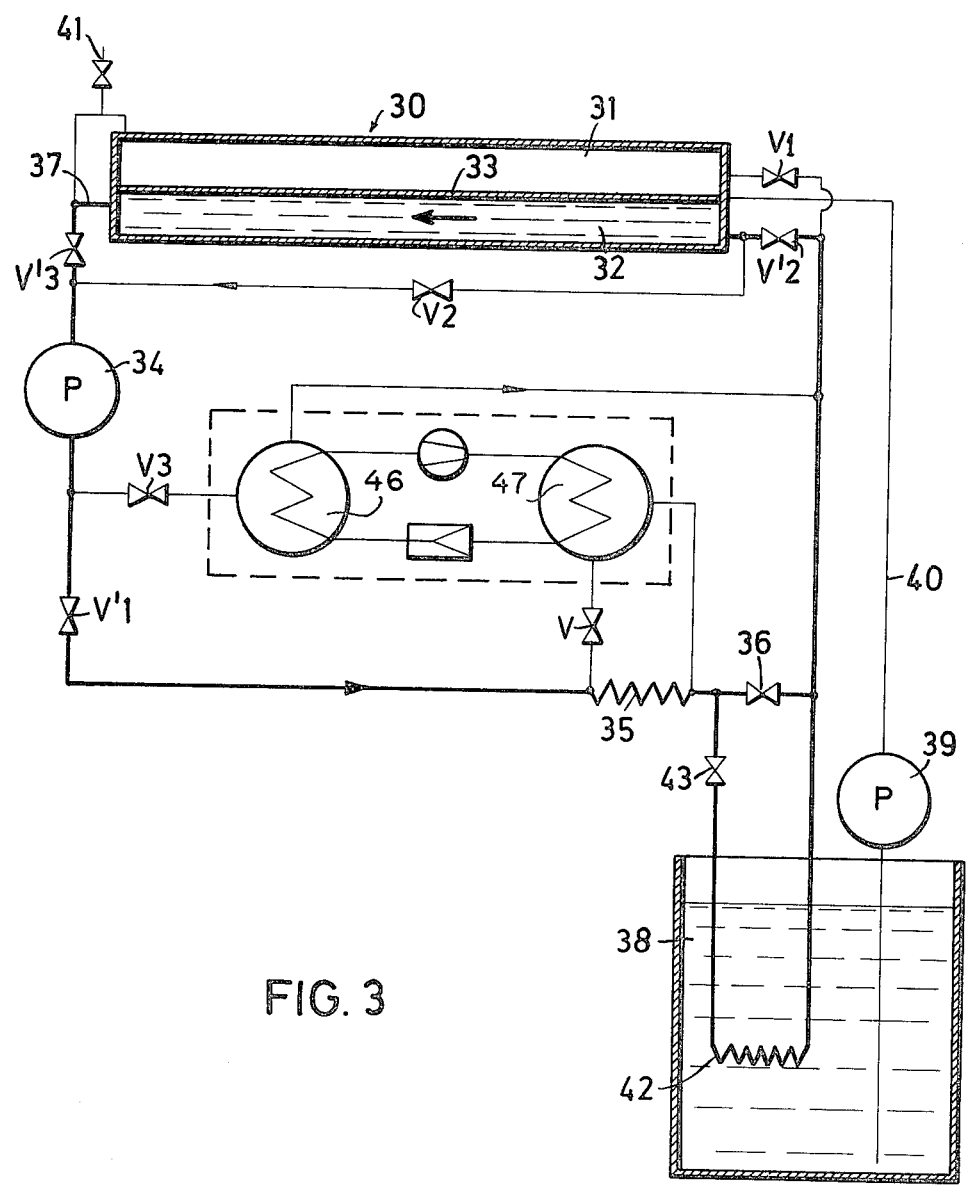
FIG. 3 is a schematic circuit diagram showing the connection of a two chamber collector of the invention having a first type of operation.
Figure 4:
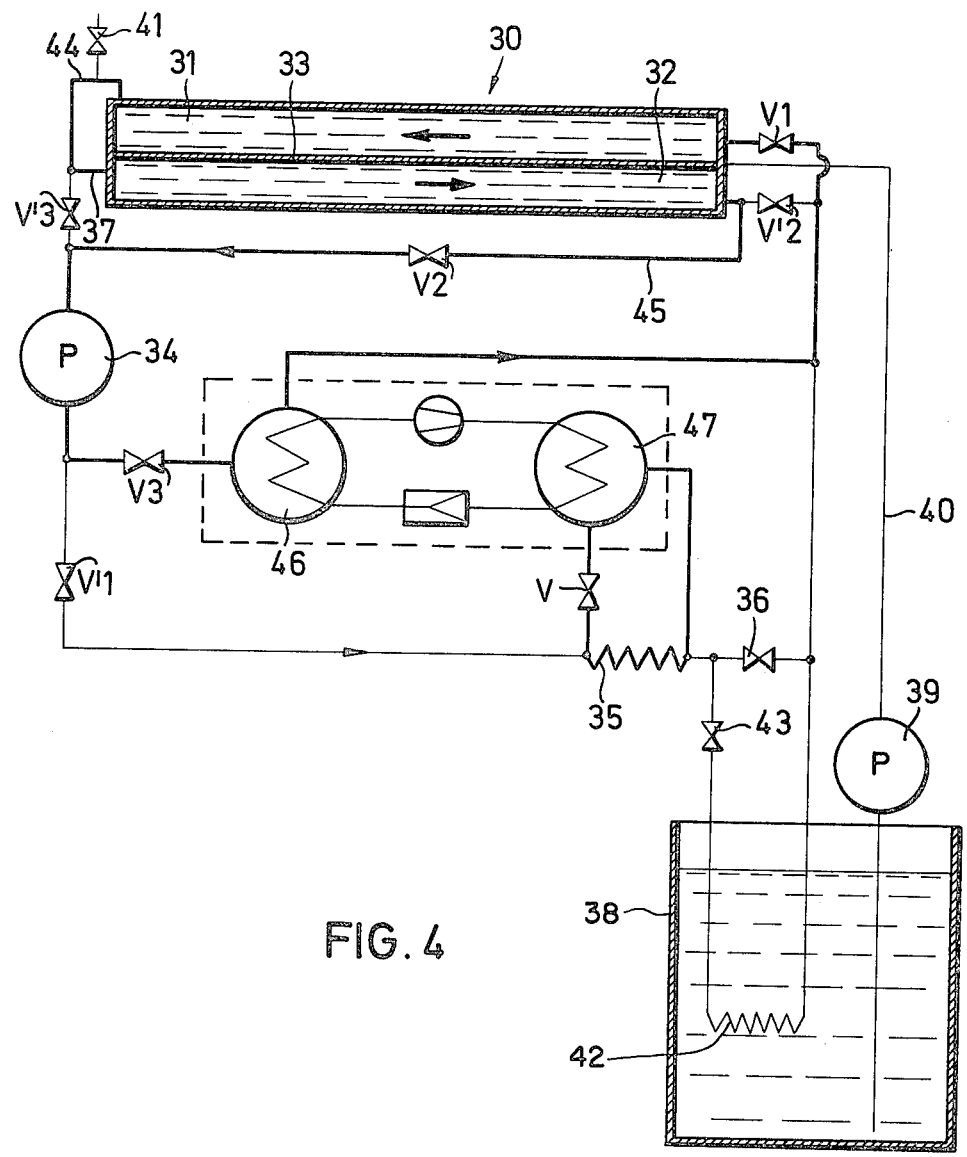
FIG. 4 is a schematic circuit diagram showing the connection of a two chamber collector with a further type of operation.

In FIGS. 3 and 4, the heat collector, generally designated 30, comprises two chambers 31 and 32 which are flatly arranged, one above the other, and separated by a separator wall 33. The lower chamber 32 absorbs the radiation incident to or falling upon the upper chamber 31 and passing therethrough. The volume of the upper chamber 31 is substantially heated by heat conductivity through the cover of the upper chamber. As is evident in the drawings, heat collector 30 has inlet conduit means, outlet conduit means and contains a heat transmitting liquid. A first fluid flow means or connecting lines, as shown, connect the first exchanger 46 between the inlet and outlet conduit means. A second fluid flow means or connecting lines, as shown, connect the second heat exchanger 47 with the heat consuming device 35. A third fluid flow means or connecting lines, as shown, connect the heat consuming device 35 between the inlet and outlet conduit means while bypassing the first and second heat exchangers 46 and 47.

As shown, different valves designated V and V', are disposed in the supply and outlet lines or conduits of chambers 31 and 32. In the type of operation shown in FIG. 3, valves designated V' are open and valves designated V are closed. In the state or type of operation shown in FIG. 4, valves designated V are open and valves designated V' are closed. The valves V and V' constitute valve means for selectively directing liquid through the first, second and third fluid flow means as described herein.

With a low load operation as shown in FIG. 3, pump 34 delivers fluid through open valve V'1 to the heat consuming device 35 where the fluid cools down. The cooled fluid then flows through the open shut-off valves 36 and V'2 into the lower chamber 32 of the heat collector 30. The wall of the upper chamber 31 is transparent. Chamber 31 does not contain fluid but is filled with air. Thus, the fluid moving through lower chamber 32 is heated by absorption of the incident radiation upon the upper chamber 31. The heated fluid leaves chamber 32 through conduit 37 to flow through the open valve V'3 to pump 34. Lower chamber 32 is lined with an absorption layer to increase radiation absorption through the upper chamber 31. In this type of an operation as shown in FIG. 3, only radiation heat is produced but no ambient heat is obtained from the air.

Water in reservoir 38 may be pumped into either of the chambers 31 and 32 through the filling and discharge line 40 via the pump 39. The discharge of the chambers 31 and 32 may also take place through line 40. The vent valve 41 is opened while the chambers 31 and 32 are being either evacuated or filled. Reservoir 38 may also be used as a storage for surplus heat.

Cooling spiral 42 is disposed in water reservoir 38 for cooling the fluid leaving the heat consuming device 35 below the ambient temperature of heat collector 30. Valve 43 is opened and valve 36 is closed thereby causing the appropriate flow through the cooling spiral 42. Upon leaving cooling spiral 42, the cooled fluid is introduced to the lower chamber 32 through valve V'2.

In the operation of FIG. 4, the fluid flows through both chambers 31 and 32 of the heat collector 30. Fluid passes through open valve V'1 into the upper chamber 31 at a temperature below the ambient temperature. The fluid is heated predominantly by convection in chamber 31. Thereafter, it leaves upper chamber 31 through conduit 44 which communicates with line 37 passing into the lower chamber 32. The flow direction in the chambers are indicated by the arrows. Fluid then leaves the lower chamber 32 through conduit 45 and the open valve V2 and through the pump 34. The fluid then is pumped through open valve V3 to the evaporator or heat exchanger 46 of the heat pump to cool down and subsequently recycled through valve V1 into the upper chamber 31. Condensor or heat exchanger 47 of the heat pump is directly connected to the heat consuming device 35. The heat pump in FIGS. 3 and 4 operates in precisely the same fashion as the heat pump 12 shown and described in FIG. 1.

An alternate method of operation of the working example of FIG. 4 provides for the fluid to pass through the two chambers 31 and 32 in the same direction. This is accomplished by simply providing the inlets and outlets of chambers 31 and 32 accordingly. Thus, valves V1 and V'2 could be used as inlet valves while valve V'3 could be an outlet valve for both chambers 31 and 32. Thus, the additional advantage would be that the end of chamber 31 at which the fluid has the highest temperature is adjacent to the end of chamber 32 at which the fluid of the chamber also has the highest temperature.

Figure 5:
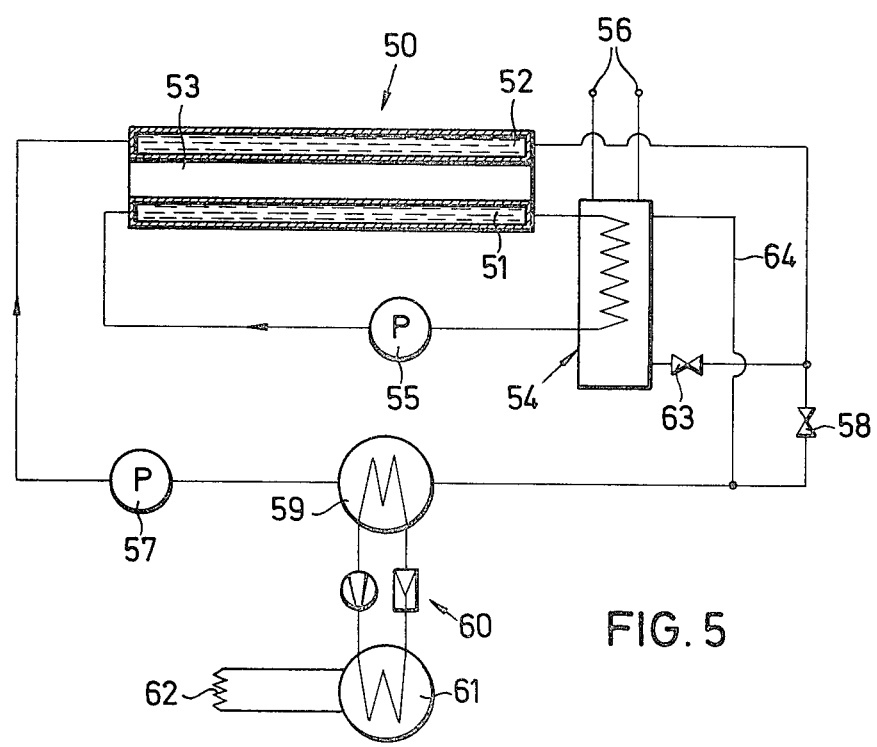
FIG. 5 is a schematic circuit diagram of a two chamber collector of this invention in which the two chambers are separated by a radiation permeable insulating layer.

A third variation of the heat collector system of the instant invention is shown in FIG. 5. Heat collector, generally designated 50, comprises a lower chamber 51 and a transparent upper chamber 52. Chamber 51 has an absorption layer for heat radiation. A gas insulation layer 53 separates chambers 51 and 52 and they contain air or an inert gas like Argon or Krypton.

With a sufficient offer of energy from radiation heat, the fluid flow in upper chamber 52 is not circulated. The fluid heated in lower chamber 51 by heat radiation is conducted through heat exchanger 54 via pump 55 and again into the lower chamber 51. Secondary lines 56 of the heat exchanger 54 are connected to a heat consuming device (not shown).

If the demand of energy is higher than that being obtained by radiant energy through the operation of chamber 51, a second fluid circuit is put into operation involving the upper chamber 52. Pump 57 drives the fluid through upper chamber 52 through valve 58 to the evaporator 59 of the heat pump, generally designated 60. The fluid is then recycled back to chamber 52. The condensor 61 of the heat pump 60 is connected to the heat consuming device 62.

With this switch variant, it is possible to deliver heat separately from the lower and the upper chambers to several consuming devices or to one consuming device only. This is of particular advantage for fresh air heaters in which the heating of fresh air current is realized via a heating cascade. In such a case, the heat energy of lower chamber 51 would be delivered to a heating register fitted in the fresh air current to preheat it. Final heating of the air current, if necessary, is performed by a heating register connected subsequently and fed by low temperature heat of the upper collector circuit processed by the heat pump 60.

By separating the fluid currents of chambers 51 and 52 it is also possible to store heat from the lower chamber 51 in a heat accumulator. For example, such storage or accumulation of heat could be used for the night time or for the morning heating phase in a building. It also would be used to comply with the generally lower demand of daytime energy via the fluid current of the upper chamber 52.

The system of FIG. 5 is of particular importance and advantage from the viewpoint of energy economy. That is, the direct utilization of the heat contained in the fluid current of lower chamber 51 and the existing higher temperature level of upper chamber 52 at least during the sunshine phases of the day avoids the conversion of qualified heat into heat of poor quality by blending.

It is possible to influence two circuits by closing valve 58 and opening valve 63. Thus, under these circumstances, fluid leaving upper chamber 52 does not directly get into evaporator 59 of heat pump 60 but passes through heat exchanger 54 first to flow via conduit 64 to evaporator 59. The fluid is first preheated in exchanger 54 before it is fed to heat pump 60, thereby operating heat pump 60 at a more favorable performance level. In this instance, fluid leaving heat pump 59 for recycling to upper chamber 52 is still at a temperature below the ambient temperature of collector 50.

While the heat collector system has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A heat collector system comprising:
   (a) a heat collector having an inlet conduit means, an outlet conduit means, and containing a heat transmitting liquid,
   (b) a heat pump having first and second heat exchangers in the form of an evaporator and a condensor and a cooling fluid circuit interconnecting said heat exchangers,
   (c) said heat collector being effective to take radiation heat from the environment,
   (d) the heat collector having a structural configuration effective to additionally absorb convection heat as a convector which causes a good heat transmission between the ambient air and said heat transmitting fluid,
   (e) first fluid flow means for connecting the first heat exchanger between said inlet and outlet conduits,
   (f) a heat consuming mechanism,
   (g) second fluid flow means for connecting the condensor with the heat consuming mechanism,
   (h) third fluid flow means for connecting the heat consuming mechanism between said inlet and outlet conduits while bypassing the first and second heat exchangers,
   (i) the evaporator being capable of supplying liquid to the heat collector at a temperature below the temperature of the ambient air,
   (j) the collector includes two superimposed chambers including an upper chamber made of transparent material and having a heat conductive surface and a lower chamber having a structural configuration effective to absorb heat radiation, and
   (k) valve means being effective to selectively direct the fluid flow only through the lower chamber or first through the upper and then through the lower chamber.

2. A system as defined in claim 1 wherein
said heat consuming mechanism is connected to the lower chamber via said valve means and said third fluid flow means and said upper chamber is closed to the flow of liquid.

3. A system as defined in claim 1 wherein
the two chambers are connected in series by a connecting line,
said chambers being connected to said heat pump,
valve means being effective to control said flow through the system.

4. A system as defined in claim 1 wherein
discharge line means is effective to discharge liquid from the upper and lower chambers.

5. A heat collector system comprising:
   (a) a heat collector having an inlet conduit means, an outlet conduit means, and containing a heat transmitting liquid,
   (b) a heat pump having first and second heat exchangers in the form of an evaporator and a condensor and a cooling fluid circuit interconnecting said heat exchangers,
   (c) said heat collector being effective to take radiation heat from the environment,
   (d) the heat collector having a structural configuration effective to additionally absorb convection heat as a convector which causes a good heat transmission between the ambient air and said heat transmitting fluid,
   (e) first fluid flow means for connecting the first heat exchanger between said inlet and outlet conduits,
   (f) a heat consuming mechanism,
   (g) second fluid flow means for connecting the condensor with the heat consuming mechanism,
   (h) third fluid flow means for connecting the heat consuming mechanism between said inlet and outlet conduits while bypassing the first and second heat exchangers,
   (i) the evaporator being capable of supplying liquid to the heat collector at a temperature below the temperature of the ambient air,
   (j) valve means for selectively directing liquid through said first, second and third fluid flow means, and
   (k) the collector includes two superimposed chambers including an upper chamber made of transparent material and having a heat conductive surface and a lower chamber having a structural configuration effective to absorb heat radiation,
   (l) said valve means being effective to selectively direct the fluid flow only through the lower chamber or first through the upper and then through the lower chamber,
   (m) discharge line means is effective to discharge liquid from the collector to the water reservoir, and
   (n) a heat exchanger is disposed in the water reservoir,
   (o) said water reservoir is effective to contain the liquid from the collector as a heat accumulator for said heat exchanger located in said reservoir.

6. A heat collector system comprising:
   (a) a heat collector having an inlet conduit means, an outlet conduit means, and containing a heat transmitting liquid,
   (b) a heat pump having first and second heat exchangers in the form of an evaporator and a condensor and a cooling fluid circuit interconnecting said heat exchangers,
   (c) said heat collector being effective to take radiation heat from the environment, (d) the heat collector having a structural configuration effective to additionally absorb convection heat as a convector which causes a good heat transmission between the ambient air and said heat transmitting fluid,
(e) first fluid flow means for connecting the first heat exchanger between said inlet and outlet conduits,
(f) a heat consuming mechanism,
(g) second fluid flow means for connecting the condensor with the heat consuming mechanism,
(h) third fluid flow means for connecting the heat consuming mechanism between said inlet and outlet conduits while bypassing the first and second heat exchangers,
(i) the evaporator being capable of supplying liquid to the heat collector at a temperature below the temperature of the ambient air,
(j) valve means for selectively directing liquid through said first, second and third fluid flow means, and
(k) a regulating device is effective to regulate the difference in temperature between the temperatutre of ambient air and the cooling temperature.

7. A system as defined in claim 6 wherein said heat collector includes a cover means laterally displaced therefrom to provide a flow of gas therebetween to provide a supply of heat by heat convection.

8. A system as defined in claim 6 wherein a pump effects flow through the first and third fluid flow means.

9. A heat collector system comprising:
(a) a heat collector having an inlet conduit means, an outlet conduit means, and containing a heat transmitting liquid,
(b) a heat pump having an evaporator, a condensor and a cooling fluid circuit interconnecting said evaporator and condensor,
(c) said heat collector being effective to take radiation heat from the environment,
(d) the heat collector having a structural configuration effective to additionally absorb convection heat as a convector which causes a good heat transmission between the ambient air and said heat transmitting fluid,
(e) first fluid flow means for connecting the evaporator between said inlet and outlet conduits,
(f) a heat consuming mechanism,
(g) second fluid flow means for connecting the condensor with the heat consuming mechanism,
(h) third fluid flow means for connecting the heat consuming mechanism between said inlet and outlet conduits while bypassing the evaporator and condensor, and
(i) the evaporator being capable to supply liquid to the heat collector at a temperature below the temperature of the ambient air,
(j) valve means for selectively directing liquid through said first, second and third fluid flow means,
(k) the collector includes two superimposed chambers including an upper chamber made of transparent material and having a heat conductive surface and a lower chamber having a structural configuration effective to absorb heat radiation,
(l) said valve means being effective to selectively direct the fluid flow only through the lower chamber or first through the upper and then through the lower chamber,
(m) when said fluid flow is directed only through the lower chamber, said third fluid flow means is connected and said first and second fluid flow means are unconnected,
(n) when said fluid flow is directed through both the upper and lower chambers, said first and second fluid flow means are connected and said third fluid flow means are unconnected.

* * * * *